Apr. 26, 1932 F. R. SWITZER Re. 18,441

TYPEWRITER RIBBON REJUVENATOR

Original Filed May 2, 1929

Inventor

F. R. Switzer

By Johnston & Jennings Attorneys

Reissued Apr. 26, 1932

Re. 18,441

UNITED STATES PATENT OFFICE

FLOYD R. SWITZER, OF BIRMINGHAM, ALABAMA, ASSIGNOR TO RIBBONEW COMPANY, A CORPORATION OF ALABAMA

TYPEWRITER RIBBON REJUVENATOR

REISSUED

Original No. 1,820,583, dated August 25, 1931, Serial No. 359,983, filed May 2, 1929. Application for reissue filed October 30, 1931. Serial No. 572,149.

My invention relates to a device for rejuvenating and extending the useful life of a typewriter ribbon and ribbons of similar apparatus and has for its object the provision of apparatus of the character designated which shall be simple of design and construction, economical to manufacture, and which shall be effective to furnish an even supply of moistening fluid to a ribbon throughout the length thereof and thereby greatly extend the useful life of a ribbon.

A further object of my invention is to provide a small, easily manipulated device which may be readily employed from time to time as occasion requires, to moisten a typewriter ribbon with a proper solution, and which shall be effective to evenly distribute the moistening fluid throughout the ribbon without an excess at any one point which would cause the ink to spread and the impressions of the type to be blurred.

It is well known that the ink in typewriter ribbons in use soon dries out to such an extent that the impressions of the type become faint and the ribbon has to be discarded and a new one supplied. It is also well known that this occurs when only a small percentage of ink in the ribbon has been used up. Attempts have been made heretofore to apply to the ribbon a suitable ink solvent which would remoisten the ribbon and make available a larger percentage of the ink supply therein but great difficulties have been encountered in carrying out such an application in the way of supplying a uniform amount of the moistening fluid to the ribbon throughout its length. I have found that unless the ribbon be thoroughly and uniformly moistened throughout its length the impressions made from the type are uneven in appearance, varying from a faint impression where the moistening is inadequate, to blurred impressions where there is an excess of moistening fluid.

These and other difficulties are overcome by my invention and I accomplish a uniform distribution of the moistening fluid throughout the typewriter ribbon so that type impressions of uniform appearance are obtained from the ribbon and its useful life multiplied many times over what it would have been without the use of my device. In accordance with my invention I provide a pad of fibrous material which is retained by a covering or wick of felt or other equivalent material which is adapted to bear against the typewriter ribbon and provide means whereby the wick is impregnated or saturated with an even supply of moistening fluid in the nature of an ink solvent and this degree of saturation appears to remain substantially constant while the ribbon is drawn from end to end thereof over the face of the covering so that the fluid is applied to the ribbon uniformly. When this is done, the type impressions made with the ribbon are uniform and not blurred.

The moistening fluid is supplied to the back of the covering by means of a reservoir packed with loose fibrous material, which material bears directly against the back of the covering and is retained in place by the covering. This fibrous material is saturated with the moistening fluid and brings the same directly into contact with the back of the covering opposite the ribbon contacting face thereof. Preferably the covering is of such thickness and texture as to complete the uniform distribution of the fluid by capillary attraction. In addition, I employ a filling column extending upwardly from the reservoir whereby the force of gravity aids in supplying fluid to the covering. A convenient manually operable means is embodied in the device for holding the ribbon against the wick with a uniform pressure when the device is in use.

A device embodying features of my invention is illustrated in the accompanying drawings, forming a part of this application, wherein Fig. 1 is a side elevation, partly in section, of my improved device;

Figure 1:
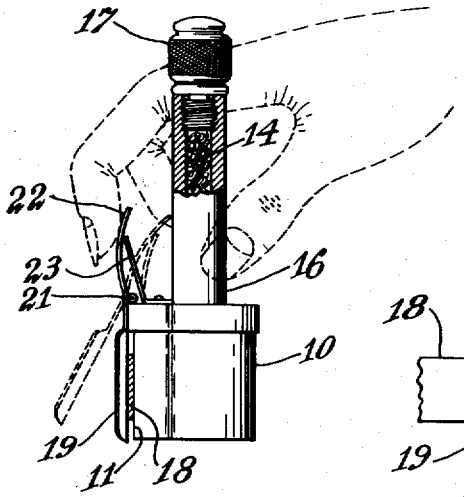
Figure 2:
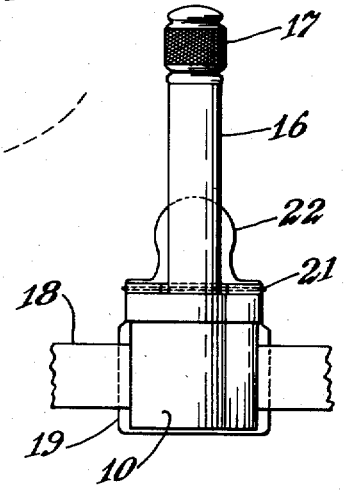
Fig. 2 is a rear elevation of the same.
Figure 3:
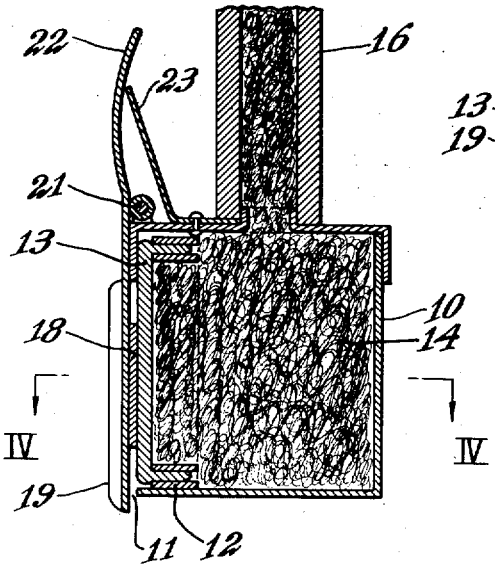
Fig. 3 is a vertical sectional view drawn to an enlarged scale.
Figure 4:
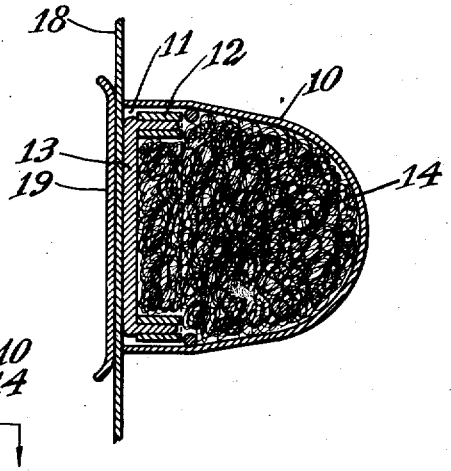
Fig. 4 is a transverse sectional view taken along the line IV—IV of Fig. 3.

Referring to the drawings for a better understanding of my invention, my improved moistening device comprises a reservoir 10 having an open side 11. Fitting within the open side 11 is a frame structure 12 which serves to retain a covering 13 made of felt or equivalent material. The reservoir 10 is packed with loose fibrous material 14 which material is retained in the reservoir by the covering 13 and is in contact with the rear of the covering directly opposite the ribbon contacting face thereof.

Extending upwardly from the reservoir 10 is a filling column 16 provided with a screw cap 17, the column 16 being also packed with the loose fibrous material. The packing 14 which extends up into the filling column is saturated with a suitable moistening fluid in the nature of an ink solvent. The fluid in the column 16 is aided by gravity in its capillary flow through the fibrous material and into the covering 13. The quantity of fluid supplied is never enough to create a running or dripping of the fluid, but only sufficient to saturate the covering.

I have found that a fluid comprising substantially 85% mineral seal oil, 6% neat's-foot oil, 4% glycerine and 5% methyl salicylate or oil of bergamot to be a suitable moistening fluid.

With the apparatus described, I have found that if a typewriter ribbon, shown at 18, is brought to bear against the saturated covering 13 in the open face of the reservoir 10, and the ribbon is drawn from end to end across the covering a uniform supply of moistening fluid is distributed to the ribbon throughout its length. In order that the ribbon 18 may be held against the covering 13 with an even pressure, I provide a plate 19 hinged to the upper edge of the reservoir 10 at 21 and provided with an upwardly extending finger piece 22 which latter is pressed forwardly by a spring 23. In use the ribbon 18 is placed under the plate 19 as shown in the drawings and is drawn across the covering 13. In manipulating the device, the filling column 16 also serves as a convenient handle, and being adjacent the finger piece 22, the plate 19 is easily operated to place it over a typewriter ribbon.

While I have shown my invention in but one form, it will be obvious to those skilled in the art that it is not so limited, but is susceptible of various changes and modifications, without departing from the spirit thereof, and I desire therefore that only such limitations shall be placed thereupon as are imposed by the prior art, or as are specifically set forth in the appended claims.

It is understood that the term "typewriter" ribbon, as employed in the specification and claims, is intended to apply to equivalent apparatus employing an inked ribbon to obtain type impressions.

What I claim is:

1. A typewriter ribbon moistener comprising a reservoir having an opening in one side thereof and being packed with loose fibrous material saturated with a moistening fluid, a covering of close fibrous material disposed across the opening, and a spring pressed plate hinged across the opening and adapted to press the typewriter ribbon against the covering.

2. A typewriter ribbon moistener comprising a reservoir having an opening in one side thereof and being packed with loose fibrous material saturated with a moistening fluid, a covering of close fibrous material disposed across the opening, a spring pressed plate hinged across the opening and adapted to press the typewriter ribbon against the covering, and a filling column extending upwardly from the reservoir and having a packing of loose fibrous material saturated with a moistening fluid and bearing against the covering.

3. A portable moistener for typewriter ribbons comprising a reservoir having an opening in one side thereof and being packed with loose fibrous material saturated with a moistening fluid, a filling column extending upwardly from the reservoir and also packed with the loose fibrous material, a spring pressed plate covering the opening and hinged to the upper side thereof, said plate being adapted to press the ribbon against the open side of the reservoir, a finger piece for the plate extending alongside the filling column and a felt covering disposed across the opening in the side of the reservoir and bearing against the loose fibrous material on one side and the ribbon on the other.

4. A typewriter ribbon moistener comprising a reservoir for a moistening fluid, said reservoir having an opening in one side thereof and being packed with loose fibrous material, a wick like covering disposed across the opening, and in contact with the fibrous material, a plate hinged across the opening, and adapted to press the typewriter ribbon against the covering, and means for accomplishing such pressure.

5. A typewriter ribbon moistener comprising a reservoir for the moistening fluid, said reservoir having an opening in one side thereof and being packed with loose fibrous material, a wick like covering disposed across the opening, a plate disposed across the opening, and a spring adapted to urge the plate against the typewriter ribbon to press the latter against the covering.

6. A typewriter ribbon moistener comprising a reservoir for a moistening fluid, said reservoir having an opening in one side thereof and being packed with loose fibrous material, a wick like covering disposed across the opening, means securing said covering to the walls of said reservoir to hold said fibrous material in place and a plate disposed across the opening adapted to press the typewriter ribbon against the covering.

7. A typewriter ribbon moistener comprising a reservoir for moistening fluid, said reservoir having an opening in one side thereof and being packed with loose fibrous material, a wick like covering disposed across the opening, and detachably secured to the reservoir walls to secure said loose material in place, and a plate disposed across the opening, adapted to press the typewriter ribbon against the covering.

8. A typewriter ribbon moistener comprising a capillary pad, a holder therefor, a plate hinged to said holder and a spring urging said plate against a face of said pad, said pad including a body of fibrous material and a wick like facing having its rear surface in direct contact with said fibrous material.

9. A typewriter ribbon moistener comprising a capillary pad having a substantially flat face, a holder for said pad, a plate hinged to said holder for urging a typewriter ribbon against the face of said pad, said pad including a body of loose fibrous material, and a facing therefor of wick like material, having its rear surface in direct contact with said fibrous material.

10. A typewriter ribbon moistener comprising a reservoir for the moistening fluid, said reservoir having an opening in one side thereof and being packed with loose fibrous material, a wick like facing disposed across the opening, a cover disposed across the opening, and a spring adapted to urge the cover against the typewriter ribbon to press the latter against the wick like facing.

11. A typewriter ribbon moistener comprising a capillary pad, a holder therefor, a substantially flat cover hinged to said holder and means urging said cover against the face of said pad, said pad including a body of fibrous material and a wick like facing having its rear surface in direct contact with said fibrous material.

In testimony whereof I hereunto affix my signature.

FLOYD R. SWITZER.